C. E. MARSH.
PORTABLE LOCOMOTIVE JOURNAL TURNING MACHINE.
APPLICATION FILED NOV. 7, 1919.
1,417,621.
Patented May 30, 1922.
6 SHEETS—SHEET 4.
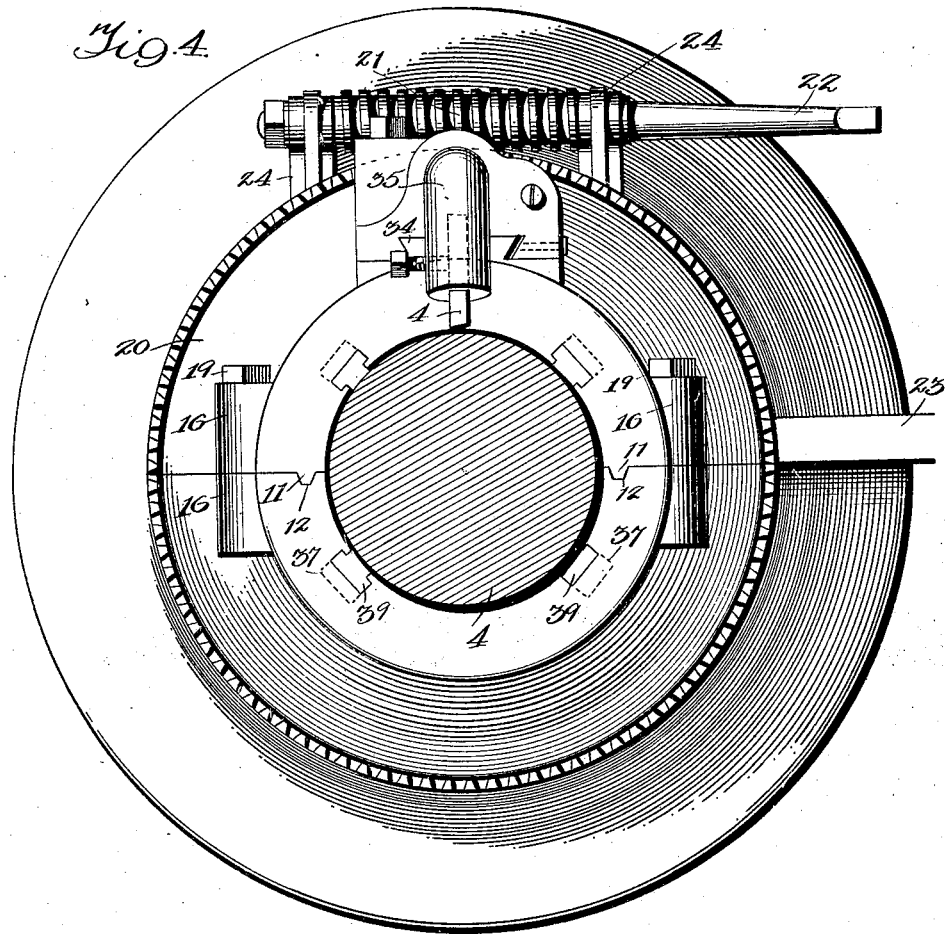
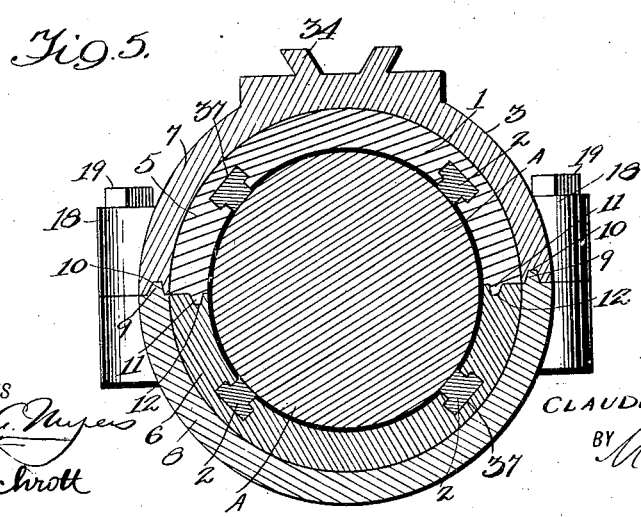
INVENTOR
CLAUDE E. MARSH,
BY
ATTORNEYS
WITNESSES

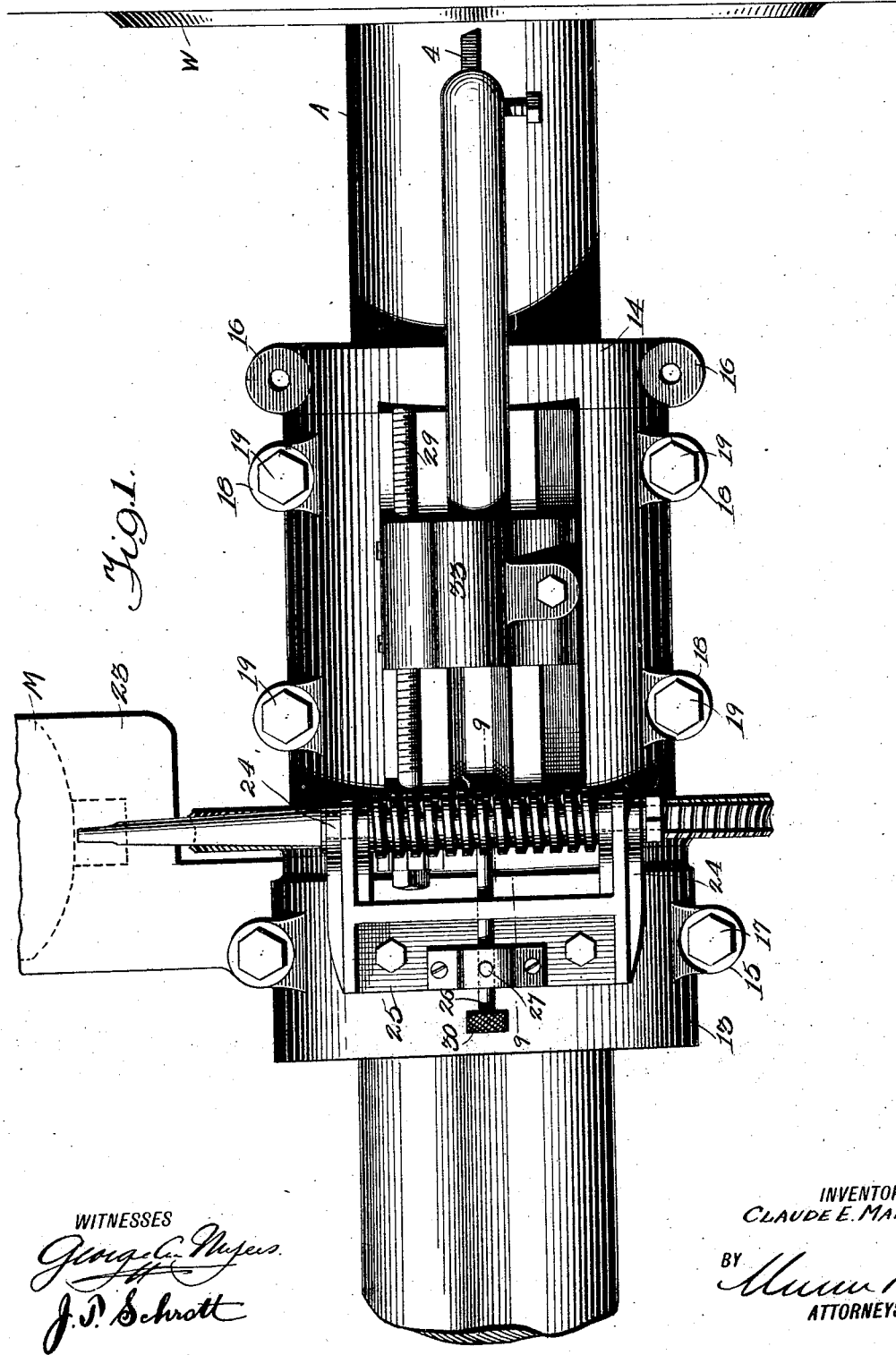

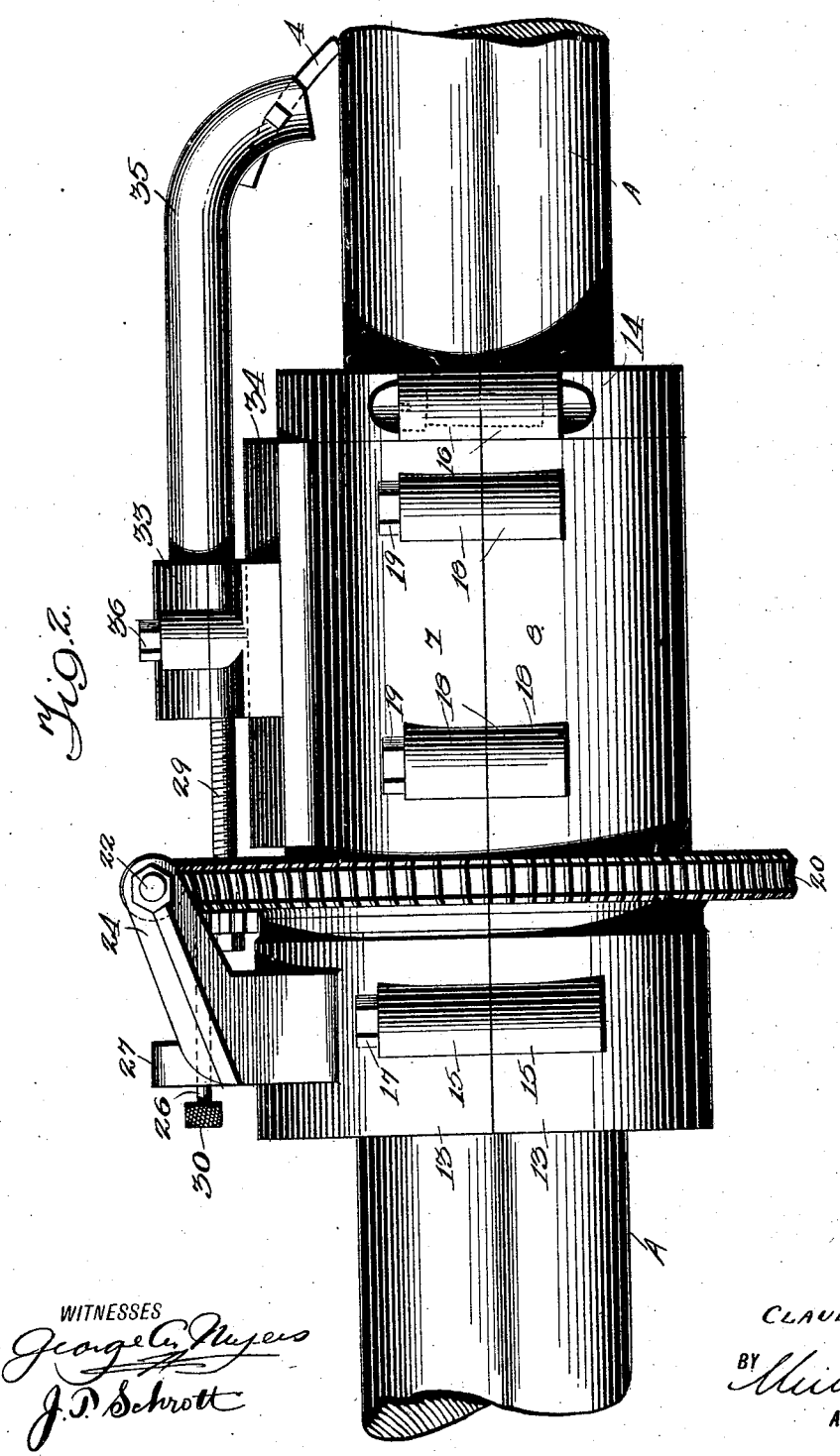

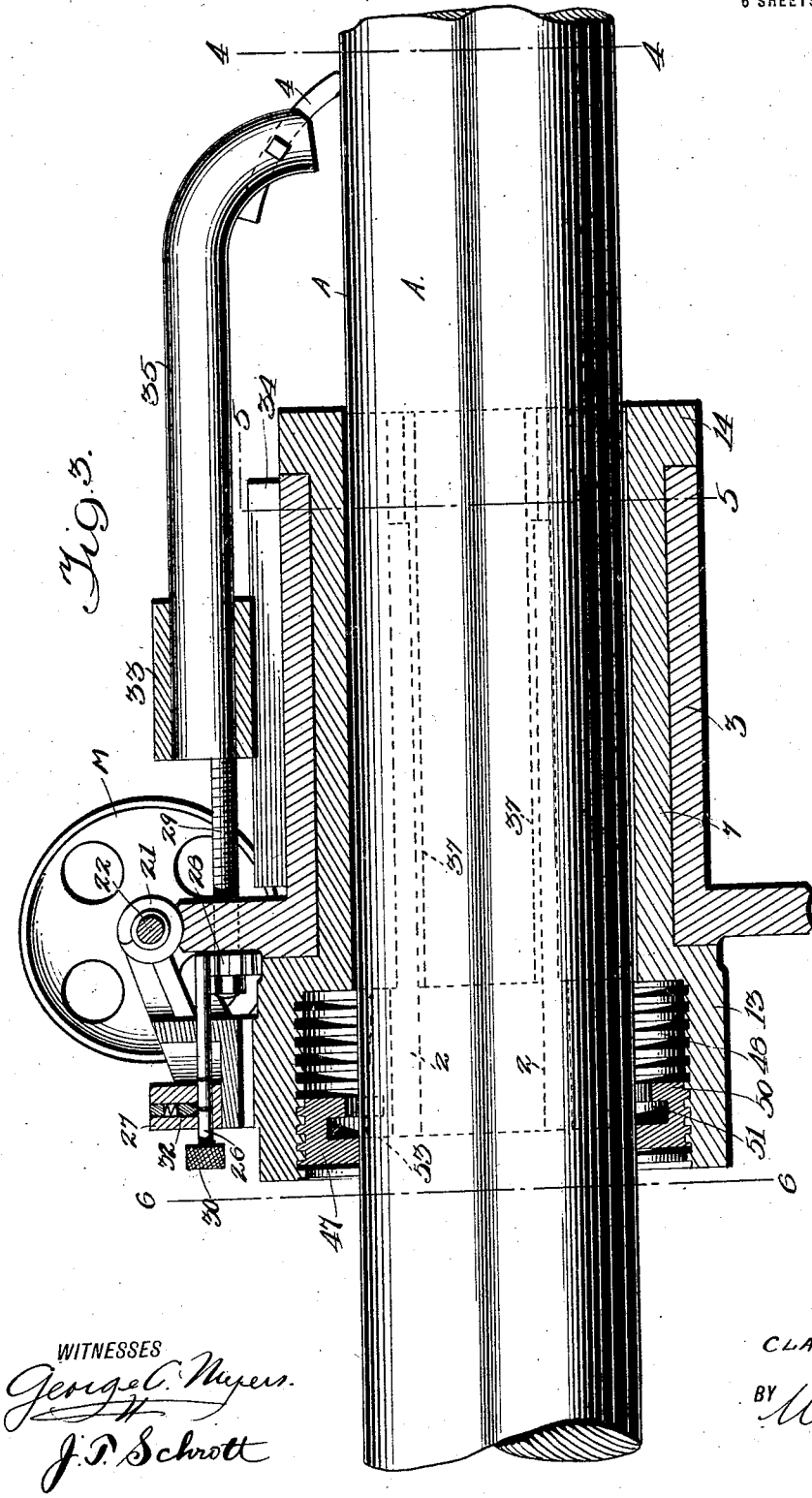

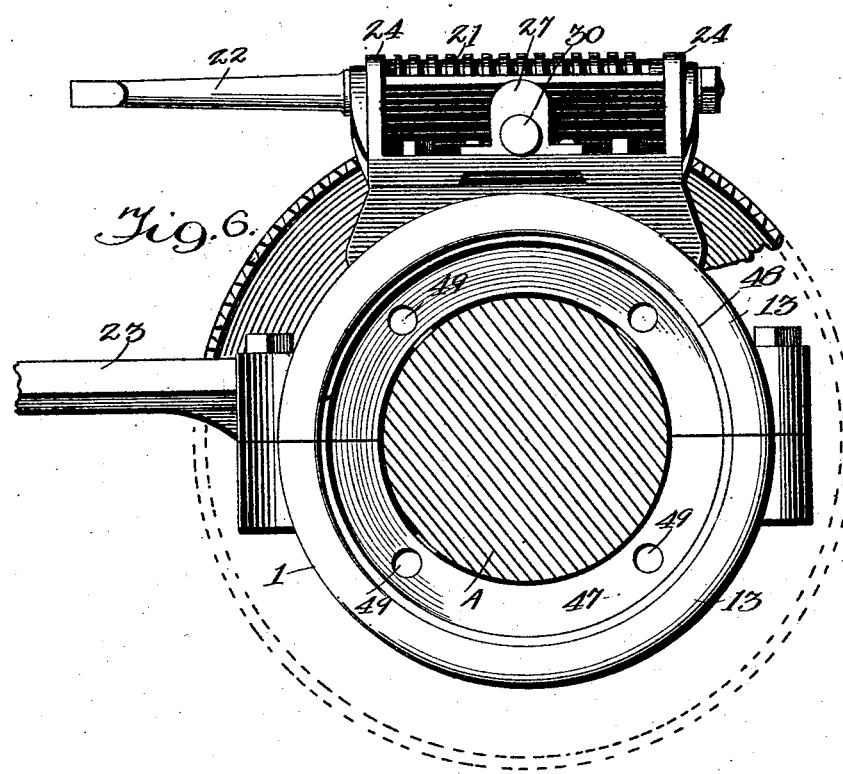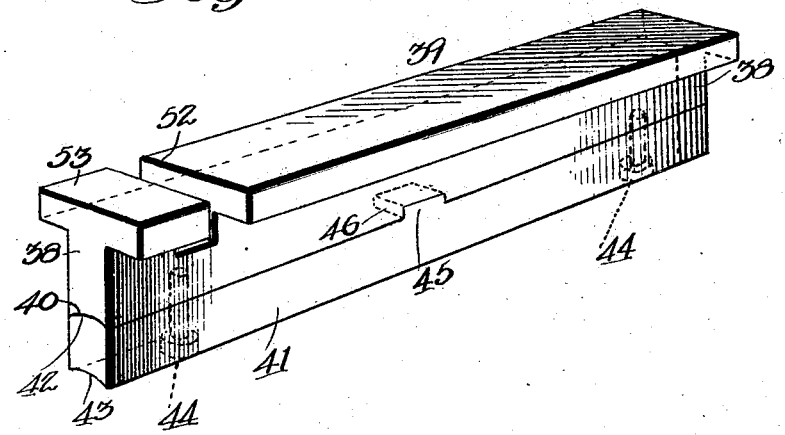

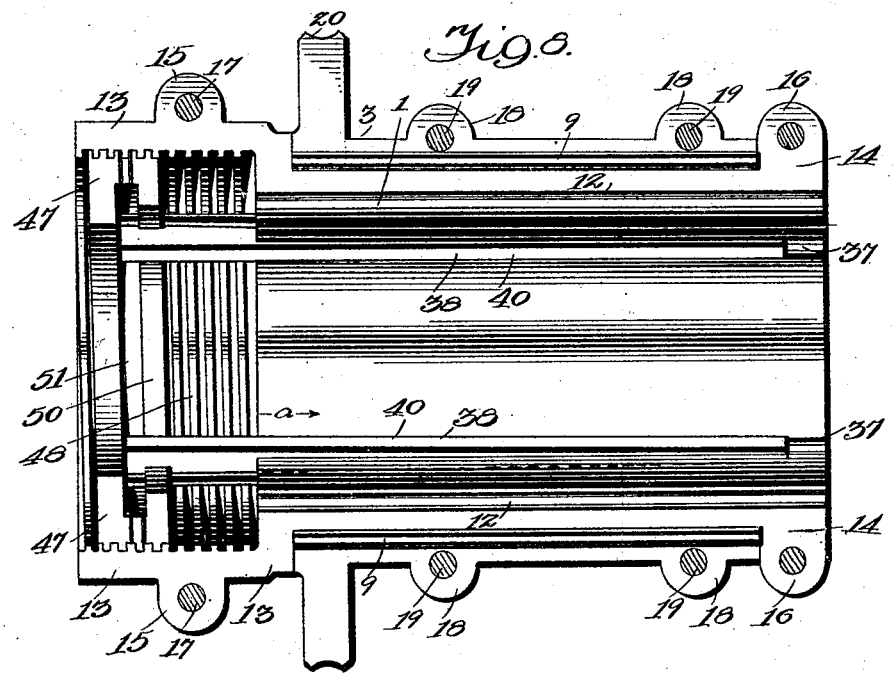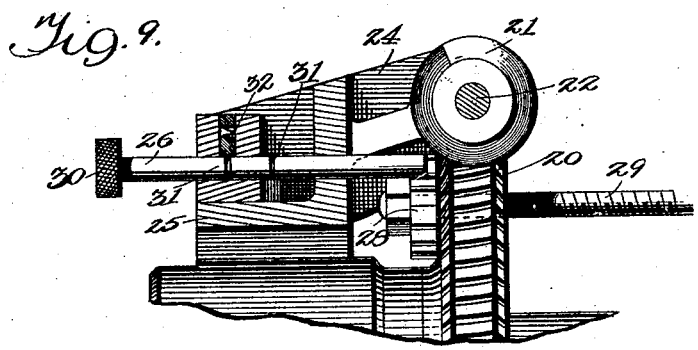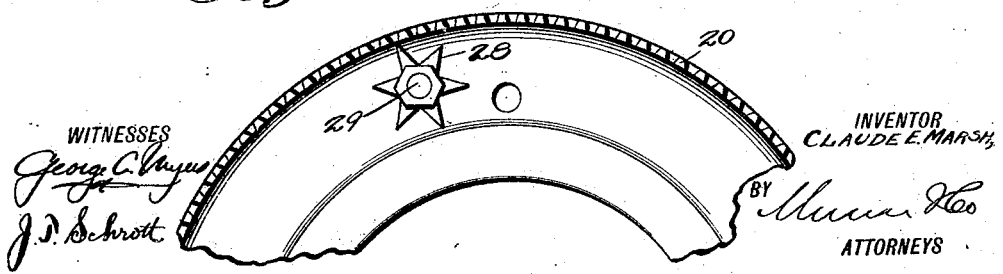

UNITED STATES PATENT OFFICE.

CLAUDE E. MARSH, OF ATLANTA, GEORGIA.

PORTABLE LOCOMOTIVE-JOURNAL-TURNING MACHINE.

1,417,621.  Specification of Letters Patent.  Patented May 30, 1922.

Application filed November 7, 1919. Serial No. 336,348.

*To all whom it may concern:*

Be it known that I, CLAUDE E. MARSH, a citizen of the United States, and a resident of Atlanta, in the county of Fulton and State of Georgia, have invented certain new and useful Improvements in Portable Locomotive-Journal-Turning Machines, of which the following is a specification.

My invention relates to improvements in journal turning machines, and it consists in the constructions, combinations and arrangements herein described and claimed.

The foremost object of my invention is to provide a portable turning machine for use in trueing locomotive and car journals, crank pins, etc.

A further object of the invention is to provide a portable journal trueing machine which can be applied without removing the wheels, as in case when the machine is employed on locomotive axles.

A further object of the invention is to provide improved clamping means whereby pressure is uniformly applied to the axle on which the machine is mounted, and to which the machine is firmly held in the correct operative position.

A still further object of the invention is to provide a portable journal trueing machine which is capable of use on different sizes of axles, this capability being brought about by the provision of extension clamping keys which are made in various sizes to suit varying requirements.

Other objects and advantages will appear in the following specification, reference being had to the accompanying drawings, in which:

Figure 1 is a plan view of the improved journal turning machine,

Figure 2 is a side elevation thereof,

Figure 3 is a longitudinal section,

Figure 4 is a cross section taken substantially on the line 4—4 of Figure 3,

Figure 5 is a detail cross section taken substantially on the line 5—5 of Figure 3, the sliding tool post being omitted, Figure 6 is a detail cross section on the line 6—6 of Figure 3, Figure 7 is a detail enlarged perspective view of one of the keys, also illustrating the application of an extension key when the turning machine is to be used on a smaller sized axle, Figure 8 is a plan view of one-half of the separable body of the machine, Figure 9 is a detail sectional view taken substantially on the line 9—9 of Figure 1 and showing the retractible trip pin of the star wheel, and Figure 10 is a detail view of a portion of the worm drive gear and illustrating the position of the star wheel.

In carrying out my invention I provide a hollow arbor 1, which is stationarily held on the locomotive axle A by means of a plurality of taper keys or wedges 2, on which stationarily held arbor 1 the rotary tool arbor 3 is mounted, carrying the turning tool 4 by means of which the journal portion of the axle is trued.

Each arbor 1 and 3 is made in halves, respectively designated 5, 6 and 7, 8, so as to enable the application of the machine to the axle of the locomotive without removing the wheels W. This in itself is a feature of considerable importance, namely, the avoidance of the requirement of removal of the wheels because in performing this operation, much valuable time is lost because of the extreme tightness of locomotive wheels on the ends of their axles. The turning machine herein described can be applied and placed in readiness for operation in several hours.

Tongues 9 on the rotary arbor 3, enter grooves 10 when the halves are fitted together as in Figure 5. Similarly, the halves 5 and 6 of the stationary arbor 1, have tongues and grooves 11, 12 fitting together. These various tongues and screws enable the proper registration of the various halves of the arbors, so that the operator need give himself no concern as to the proper fitting together when he applies the machine to the axle.

Enlargements 13, 14 on the stationary arbor 1, form thrust bearings for the revolving tool arbor 3. These enlargements have ears 15, 16, through which bolts, screws, or other equivalent fastening means 17 are passed in order to hold the half sections together. The same arrangement obtains in the rotary tool arbor which also has ears 18 through which bolts 19, or other equivalent fastening means, are passed, to hold the sections together.

Formed on the halves 7, 8 of the rotary tool arbor 3 are half worm gear sections which when put together form the entire worm driving gear 20, by means of which the tool arbor 3 is rotated when actuated by the worm pinion 21. The worm pinion in turn, includes the shaft 22, to which any suitable type of motor M is applied.

The motor is mounted on a bracket 23 which is carried by the upper half section of the rotary tool arbor 1. The motor M is indicated in dotted lines in Figures 1 and 3, the bracket 23 being shown cut away in the center in order to make room for the revolving worm gear 20.

Bearings 24, forming a part of a bracket 25 which is suitably affixed to the upper enlargement 13 of the stationary arbor 1, supports the worm pinion 21. It may be here observed that when the machine is taken apart, that is to say, off of the axle A, the uppermost sections or halves 5 and 7 of the stationary and revolving arbors grow together, because of the connection of the worm pinion 21 with the upper section of the worm gear 20.

A trip pin 26 is movably mounted in the support 27 on the bracket 25, and normally, the point of the pin occupies a position in the path of the star wheel 28 on the feed shaft 29. A knurled head 30 enables manipulation of the trip pin, so that the pin may either be projected into the operative position shown in Figure 9, or retracted out of the operative position.

In either case, one of the circular grooves 31 is engaged by the point of the spring detent 32, so that the trip pin is held from jarring out of position. As the star wheel 28 is repeatedly struck by the point of the trip pin 26, the feed shaft 29 is slowly rotated in a step-by-step motion, so as to gradually move the slidable tool post 33 along the guides 34 on the upper section 7, in order that the tool 4 may continuously engage the surfaces of the axle A as the arbor 3 rotates.

Various types of tools 4 may be employed in the tool arm 35 in which they are held, as shown in Figure 2. It is also to be observed that the sliding tool post 33 has a clamp screw 36 by means of which the arm 35 is held in place. The guides 34 are of course made as an integral part of the upper section of the rotating tool arbor 3, the action of the machine causing the arbor 3 to rotate and at the same time, advancing the tool post 33 a short distance at each revolution of the arbor.

Attention is now directed to the manner of tightly affixing the stationary arbor 1 to the axle A. As can be plainly seen in Figures 4 and 5, the upper and lower halves 5 and 6 of the stationary arbor 1, have T-slots 37 which are occupied by the keys or wedges 2 formerly referred to. These wedges are tapering in shape as can be observed in Figures 3 and 8 and also in the detail perspective view in Figure 7.

Figure 7 shows the shank 38 of the wedge 2 to taper from the front to the back, the head 39, however, being uniform throughout. Furthermore, the contacting surface 40 of the shank 38 is slightly concaved to conform to the curvature of the axle A to which it is applied.

While Figure 7 is under consideration, it is thought well to explain the construction and purpose of the extension key 41. It is nothing more than a suitable piece of metal, convex at 42, to fit the concavity 40, and concave at 43 to fit the axle, when applied. The extension key is held in place by suitable means 44, and also has a lug 45 fitting into the recess 46 of the shank 38, to provide a firm connection and obviate the possibility of shearing the screws 44 in the action of tightening the wedges.

Ordinarily, the plain wedges or keys 2 have sufficient variation of adjustment to fit certain sizes of axles. But should it so happen that a smaller size axle is to be operated on, the wedges 2 as they normally are, will not do, because the shanks 38 are not long enough to reach. It is at such time that the extension keys or wedges 41 are made use of, and obviously they may be of any size, that is to say, the distance between the convexity 42 and concavity 43 may vary, so that any size of axle may be reached. This also is a feature of great importance, because it makes the universal application of the turning machine possible.

The actuating means for the taper wedges 2 consists of the wedge collar 47, which is made in halves, the halves having suitable tongue and groove connections through which they can be accurately fitted together. This collar is externally threaded and runs in the internally threaded chamber 48 of the enlargement 13. A spanner wrench is inserted in the holes 49, made for the purpose, so that the wedges 2 can be driven in place after all of the half sections are bolted together when the machine is in place on the axle.

Referring to Figure 8, it is to be observed that the collar 47 includes a flange 50 and groove 51. These parts respectively accommodate the groove 52 and boss 53 of the head 39. Without further explanation it should be understood that the turning of the collar 47 causes the wedges 2 to move back and forth, and the farther the wedges are driven inwardly in the direction of the arrow $a$ in Figure 8, the tighter the engagement thereof with the axle A becomes.

*The operation.*

Normally, the halves of the machine are separated, the various bolts 17 and 19 having been removed. Care is taken that all of the various working parts on the inside are in place, whereupon the two main halves of the machine are applied to the axle A on opposite sides, and the bolts 17, 19 passed through and screwed down tight in the various ears.

Up to this time the arbor 1 is loose on the axle. The operator sees to it that the tool post 33 and tool 4 are in the proper working positions, whereupon he takes a suitable spanner wrench, inserts the point in the holes 49 in Figure 6 and turns on the wedge collar 47 so that it moves inwardly and carries the wedges 2 with it. As stated before, the farther the wedges are moved toward the right in Figure 8, the tighter will become the engagement.

It is important to observe that the tightening action of the wedges increases steadily and throughout the entire length of the wedges. There is no greater stress at any one point than at another, and in view of the fact that all of the wedges are driven in at one time, pressure is applied uniformly and the machine is positioned in absolutely the correct position. By this time, the inner arbor 1 will become perfectly rigid on the axle.

The motor M is now started so that the outer revoluble arbor 3 begins to rotate on its bearing which consists of the arbor 1 between the enlargements 13, 14. At each revolution, the star wheel 28 strikes the end of the trip pin 26 so that the screw feed shaft 29 is given a slight turn each time. This gradually works the tool post 33 along the guides 34 so that the tool 4 is caused to take off a spiral shaving in an area on the journal, equal to the extent of operation or movement of the slidable tool post 33.

While the construction and arrangement of the improved axle turning machine as herein described and claimed, is that of a generally preferred form, obviously modifications and changes can be made without departing from the spirit of the invention or the scope of the claims.

I claim:—

1. A journal turning machine, comprising an arbor with an internally threaded part, a plurality of wedges circumferentially equi-spaced in the arbor, and means engaging the threads and common to all wedges, operatively concealed inside of said arbor part, and arranged to move the wedges when turned.

2. A journal turning machine, comprising an arbor provided with abutments and internal threads, normally retracted wedges carried by the arbor, means operating on said threads to simultaneously move all wedges into operative engagement with an axle when actuated in one direction, and a tool-carrying arbor rotatable on the first arbor between said abutments, when the first is stationarily held.

3. A journal turning machine, comprising an inner arbor stationarily applied to an axle, with an abutment at each extremity, one being formed by a chambered enlargement in which wedging means is operatively located; a tool-carrying arbor circumferentially rotatable on the stationary arbor between said abutments, and driving means for said arbor situated on the adjacent chambered enlargement.

4. Means enabling the application of a journal turning machine to any size axle, comprising a sectional arbor with key ways in which wedges operate, and extension wedges carried by the aforesaid wedges, of various sizes, to reach various sizes of axles.

5. Means enabling the application of a journal turning machine to any size axle, comprising a sectional arbor with key ways in which wedges operate, extension wedges carried by the aforesaid wedges, of various sizes, to reach various sizes of axles, and means carried by said arbor and arranged to actuate all wedges at once to secure uniformity of pressure and simultaneity of application of the extension wedges.

6. The combination in a journal turning machine, of a rotatable wedge collar with a flange and adjacent grooves, a plurality of T-wedges having heads with portions cut away to fit the flange and groove, and extension wedge pieces applicable to the T-wedges, with suitable securing means therefor.

7. A journal turning mechanism, comprising an arbor with a chambered end producing an external shoulder, axle turning means mounted on the arbor in abutment with the shoulder, and axle gripping means embodied in the arbor, with actuating means located in the chambered end.

CLAUDE E. MARSH.